(No Model.)

L. SOULLIERE.
AUTOMATIC CUT-OFF FOR BATTERIES.

No. 319,635. Patented June 9, 1885.

WITNESSES:
Pierce Butler
C C Linthicum

INVENTOR
Leon Soulliere,
BY
Banning & Banning,
ATTORNEY

UNITED STATES PATENT OFFICE.

LEON SOULLIERE, OF CHICAGO, ILLINOIS, ASSIGNOR, BY MESNE ASSIGNMENTS, OF ONE-HALF TO WILLIAM REETZ, OF SAME PLACE.

AUTOMATIC CUT-OFF FOR BATTERIES.

SPECIFICATION forming part of Letters Patent No. 319,635, dated June 9, 1885.

Application filed December 17, 1884. (No model.)

*To all whom it may concern:*

Be it known that I, LEON SOULLIERE, a citizen of the United States, residing at Chicago, Illinois, have invented certain new and useful Improvements in Automatic Cut-Offs for Electric Batteries, of which the following is a specification.

The object of my invention is to make a simple and practical automatic cut-off that will operate to break the electrical circuit whenever the same becomes closed from accident or other unusual cause; and my invention consists in the features of construction hereinafter described.

Figure 1:
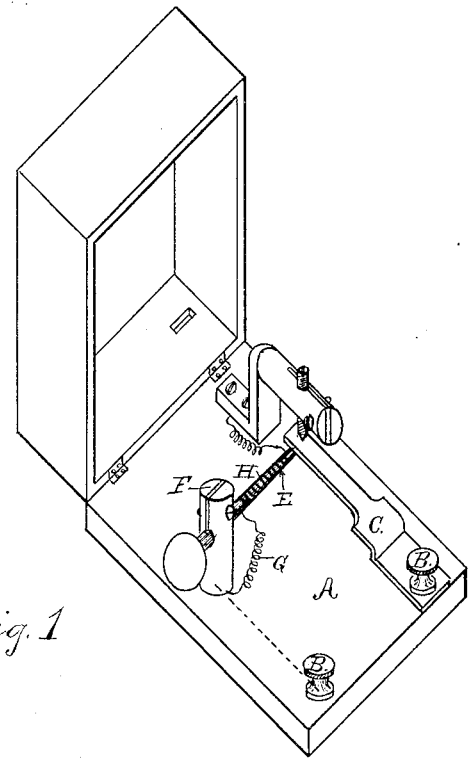
Figure 2:
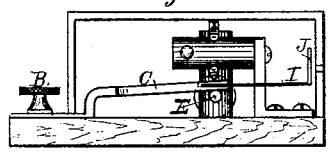
Figure 3:
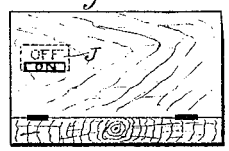

In the drawings, Figure 1 is a perspective view of the operative parts of my invention with the lid of the case in which they are placed open. Fig. 2 is a side view of the same; and Fig. 3 is an end view of the case.

A is the board on which I have mounted the operative parts of my invention; B, binding-posts for holding the wires leading from the battery and to the object to which the current of electricity is to be applied; C, a spring leading from one of the binding-posts to the holder of a platinum point against which the spring is held; E, an arm or rod of non-conducting material, which holds the spring in contact with the platinum point; F, a post or holder to hold the rod or arm in place and through which the current of electricity passes in its course; G, the wire for conducting the electricity; H, a platinum section of the same coiled around or placed in contact with the rod or arm; I, a wire leading from the spring C, and J a card containing the words "on" or "off," or similar words, supported on such wire.

Heretofore one of the difficulties that has been encountered in the use of electricity with open-circuit batteries has arisen from the liability of the circuit becoming closed at some point, so that the progress of the current of electricity would be there arrested and the battery polarized.

In the lighting of gas-jets in houses, for instance, and it is in connection with the lighting of houses that I prefer to describe my invention, the two poles at one of the gas-jets, as they are brought together to create the spark by which the gas is lighted, often adhere to each other so that the current of electricity is interrupted at that point, and no further lighting possible until the poles are separated, when the current of electrical fluid again proceeds over the wire.

Various devices have been made and various means resorted to to automatically break the current and cut off the flow of electricity whenever an interruption occurs at any point; but these devices have usually consisted of mechanical construction more or less complicated, and so liable to get out of order and fail to operate at the time their services are required. In my automatic electric cut-off, however, no complicated mechanical devices are required, and the increased intensity of heat developed on the conducting-wire between the battery and point of interruption is made to act as the efficient agent in operating the cut-off.

I will now explain the particular application of my invention as shown in the drawings, though there are other ways of applying it. Close to the battery, or at any convenient point preferred, I place a board, which need be only three or four inches square, and on which the operative parts of my invention are arranged. The conducting-wire from the battery is led onto this board and held in proper position by a binding-post. This post also holds a spring, C, made of phosphor-bronze or other suitable metal for conducting the electrical fluid, which leads to or under a platinum point supported in a suitable holder, and by contact with which the circuit is completed. This spring, which is secured at one end and free at the other, only touches the platinum point when held positively against it. To so hold it in such positive contact, I make a rod or arm, E, of hard rubber or other non-conducting material, which is stiff when cold and flexible when subjected to a high heat, and support it in, preferably, a horizontal position by means of the post F. This rod is secured at one end and free at the other, and its free end is extended under or against the free end of the spring C. The rod is stiff enough when cold to overcome the tendency of the spring to press away from the platinum point and to hold it in contact with the same; but when heated and rendered flexible the strength of the spring becomes the greater and bends the rod down so that the spring no longer touches the platinum point and the circuit is broken. To heat this arm or rod and cause it to become weakened and flexible when the electric current is interrupted, I carry the conducting-wire, which at this point I make preferably of platinum, as affording more resistance and developing greater heat, around or otherwise in contact with or in proximity to the same, so that when the current of electricity is arrested the arm will become heated and yield to the pressure of the spring.

From the post supporting the rod or arm the conducting-wire may be carried out through the other binding-post, or in any convenient way, to the various gas-jets or other objects to which the same is to be applied.

I inclose the operative parts of my invention above described in a case to prevent them from being exposed to accident, and to tell at a glance whether the circuit is completed or broken I make a slot in one end of the case and carry a wire, I, from the spring C to just in front of this opening or slot and support a card on it containing the words "on" and "off," or other similar words, implying that the circuit is complete or broken. As the spring is raised or lowered this card will be correspondingly raised or lowered, so as to expose one or the other of the words at the opening to convey the proper information. Thus it can be determined instantly and without trouble whether the circuit is complete and ready for the flow of electricity.

In operation, the electric current proceeds from the battery along the conducting-wire, which is connected to the various gas-jets in the house. At each jet positive and negative poles are placed, the gas-pipe forming one and the wire the other, which, as the electricity approaches, are brought into contact with each other in the usual way to produce the lighting spark. This contact should be only instantaneous, when they should separate, the battery being then allowed to remain open until the lighting of the next jet, and so on until all the jets have been lighted. If at any of the jets or points of contact the positive and negative poles should for any reason adhere, the flow of electricity will be arrested at that point. The electrical current, however, still proceeds from the battery, and, as it cannot pass the point of obstruction, the wire connected with the cut-off becomes heated, or rather that part of it made of platinum which is wrapped around or placed in contact with or proximity to the arm or rod which holds the spring in contact with the platinum point, by means of which the circuit is completed. The intense heat developed at this point is sufficient, in a short time, to heat the rod or arm and cause it to become weakened or flexible, so that it yields to the pressure of the spring and permits the spring to leave its contact with the platinum, whereby the circuit is instantly broken. When the rod or arm has become cooled and stiff, though its own elasticity would not cause it to rise or spring back to its former position and press the spring against the platinum point to complete the circuit, and I prefer that it would not, it could, after the difficulty had been removed, be turned half around by means of the knob at the end, so that its free end would again press the spring back to its proper place to make the completed circuit. In this way the rod or arm could be used over and over again indefinitely as to time and number of operations.

In thus describing my invention I have not meant to confine myself strictly to the details of construction described and shown. Many variations can be made, which will readily suggest themselves.

The principal or essential feature of my invention rests in the idea of utilizing the increased heat accumulated on the wire between the point of interruption and the battery to weaken the non-conducting support of a section or portion of the circuit and cause it to yield enough to permit the separation of the two sections of the circuit by means of which the circuit is broken. I have made this supported portion of the circuit in the nature of a spring; but it is obvious that it may be made without elasticity itself, and a separate spring used to press against it and destroy its contact with the platinum point on the weakening of its support, or by making it so heavy that a slight weakening of its support will cause it to sink away from contact with the other part of the circuit.

What I claim is—

1. In an open-circuit battery, a rod or arm of non-conducting material secured at one end and free at the other for holding one section or portion of the circuit in contact with another until weakened or rendered flexible by heat, substantially as described.

2. In an open-circuit battery, the combination of a spring forming part of the circuit and a support of non-conducting material secured at one end and free at the other and holding the spring in contact with another part of the circuit and thereby completing the same, substantially as described.

3. In an open-circuit battery, the combination of a spring secured at one end and free at the other, forming part of the circuit, and a support of non-conducting material, also secured at one end and free at the other, the support pressing at one side of its free end against the spring at one side of its free end, whereby the spring is held in contact with a screw or platinum point to complete the circuit and yielding when weakened by heat, whereby the spring is disengaged to break the circuit, substantially as described.

LEON SOULLIERE.

Witnesses:
EPHRAIM BANNING,
THOMAS A. BANNING.